United States Patent
Qian et al.

(10) Patent No.: US 12,132,407 B1
(45) Date of Patent: Oct. 29, 2024

(54) ADAPTIVE LOAD OPTIMIZATION METHOD FOR RESONANT GATE DRIVE CIRCUIT

(71) Applicant: SOUTHEAST UNIVERSITY, Nanjing (CN)

(72) Inventors: Qinsong Qian, Nanjing (CN); Ziyan Zhou, Nanjing (CN); Yufan Wang, Nanjing (CN); Qiang Luo, Nanjing (CN); Weifeng Sun, Nanjing (CN); Longxing Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/735,204

(22) Filed: Jun. 6, 2024

Related U.S. Application Data

(63) Continuation of application No. PCT/CN2023/126972, filed on Oct. 27, 2023.

(30) Foreign Application Priority Data

Apr. 10, 2023 (CN) .......................... 202310371814.5

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0009* (2021.05); *H02M 1/0054* (2021.05);
(Continued)

(58) Field of Classification Search
CPC ........... H02M 3/33573; H02M 1/0009; H02M 1/0054; H02M 1/088; H02M 3/01; H02M 3/33576

See application file for complete search history.

(56) References Cited

U.S. PATENT DOCUMENTS

| 10,554,140 B1 * | 2/2020 | Khamesra ......... H02M 3/33592 |
| 10,651,753 B1 * | 5/2020 | Khamesra ............... H02M 7/06 |

(Continued)

FOREIGN PATENT DOCUMENTS

| CN | 109194135 A | 1/2019 |
| CN | 111313660 A | 6/2020 |

(Continued)

OTHER PUBLICATIONS

Zhiliang Zhang, et al., Optimal Design of Resonant Gate Driver for Buck Converter Based on a New Analytical Loss Model, IEEE Transactions on Power Electronics, 2008, pp. 653-666, vol. 23 No. 2.

(Continued)

*Primary Examiner* — Yusef A Ahmed
(74) *Attorney, Agent, or Firm* — Bayramoglu Law Offices LLC

(57) ABSTRACT

An adaptive load optimization method for a resonant gate drive circuit is provided to optimize the switching loss, turn-on loss and gate drive loss under different MOSFET loads. A data table is pre-stored in a digital signal processor chip (DSP), and voltages and pre-charge times, corresponding to a low total loss, of the resonant gate driver obtained by actual tests in case of different load currents are recorded in the data table; and in actual application, after an analog-to-digital converter terminal (ADC) samples a load current, a load current, closest to the sampled load current, is read from the data table, and the digital signal processor chip (DSP) is enabled to perform table look-up to obtain an optimized voltage and pre-charge time of a gate drive circuit.

6 Claims, 5 Drawing Sheets

(51) Int. Cl.
*H02M 1/088* (2006.01)
*H02M 3/00* (2006.01)
(52) U.S. Cl.
CPC ............ *H02M 1/088* (2013.01); *H02M 3/01* (2021.05); *H02M 3/33576* (2013.01)

(56) References Cited

U.S. PATENT DOCUMENTS

| | | | | |
|---|---|---|---|---|
| 2003/0142513 | A1* | 7/2003 | Vinciarelli | H02M 1/08 363/17 |
| 2006/0083037 | A1* | 4/2006 | Leung | H02M 3/33576 363/98 |
| 2006/0170043 | A1* | 8/2006 | Liu | H02M 3/33592 257/341 |
| 2011/0096574 | A1* | 4/2011 | Huang | H02M 3/33507 363/21.18 |
| 2011/0222322 | A1* | 9/2011 | Kris | H02M 1/36 363/49 |
| 2012/0063175 | A1* | 3/2012 | Wang | H02M 3/33592 363/21.14 |
| 2013/0162322 | A1* | 6/2013 | Tao | H03K 17/04123 327/423 |
| 2016/0226389 | A1* | 8/2016 | Quaglino | G05F 1/468 |
| 2017/0054376 | A1* | 2/2017 | Quigley | H02M 3/33507 |
| 2019/0081565 | A1 | 3/2019 | Jans et al. | |
| 2019/0379288 | A1* | 12/2019 | Chaput | H02M 1/083 |
| 2021/0143688 | A1* | 5/2021 | Agrawal | H02H 3/08 |
| 2022/0374060 | A1* | 11/2022 | Krishnamurthy | H02M 1/0019 |
| 2023/0344358 | A1* | 10/2023 | Rmila | H02M 3/33569 |
| 2024/0178831 | A1* | 5/2024 | Qu | H02M 1/08 |

FOREIGN PATENT DOCUMENTS

| | | |
|---|---|---|
| CN | 111404415 A | 7/2020 |
| CN | 112260522 A | 1/2021 |
| CN | 115580154 A | 1/2023 |
| CN | 116388577 A | 7/2023 |

OTHER PUBLICATIONS

Zhiliang Zhang, et al., Adaptive Current Source Drivers for Efficiency Optimization of High Frequency Synchronous Buck Converters, IEEE, 2011, pp. 1181-1187.

Zhiliang Zhang, et al., A Digital Adaptive Discontinuous Current Source Driver for High-Frequency Interleaved Boost PFC Converters, IEEE Transactions on Power Electronics, 2014, pp. 1298-1310, vol. 29 No. 3.

* cited by examiner

ADAPTIVE LOAD OPTIMIZATION METHOD FOR RESONANT GATE DRIVE CIRCUIT

CROSS-REFERENCE TO THE RELATED APPLICATIONS

This application is a continuation application of International Application No. PCT/CN2023/126972, filed on Oct. 27, 2023, which is based upon and claims priority to Chinese Patent Application No. 202310371814.5, filed on Apr. 10, 2023, the entire contents of which are incorporated herein by reference.

TECHNICAL FIELD

The invention relates to switching power supplies, in particular to an adaptive load optimization method for a resonant gate drive circuit, and belongs to the technical field of power generation, power transformation or power distribution.

BACKGROUND OF THE INVENTION

With the constant development of portable devices, miniaturization and high efficiency have become the development goals continually pursued in the field of switching power supplies. The size and weight of switching power supplies can be reduced by increasing the switching frequency, but the increase of the switching frequency leads to a sharp increase of the losses of switch transistors, such as the gate drive loss, the switching loss and the turn-on loss.

To reduce the gate drive loss, many resonant gate drive techniques have been proposed. A resonant gate driver recovers energy from a gate capacitor by means of an LC resonator to realize a lower gate drive loss and have remarkable advantages in high-frequency application scenarios.

A current source resonant driver (CSD) is proposed to adapt to high-frequency, low-voltage and high-current application scenarios. The CSD has the most important advantage of drastically reducing the switching loss of power metal-oxide-semiconductor field effect transistors (MOSFETs) under an MHz switching frequency. The CSD realizes charge and discharge of gate capacitors of the power MOSFETs by establishing a current source, so as to greatly reduce the propagation influence of a common-source inductor on switching, thus greatly shortening the switching time and reducing the switching loss (Zhiliang Zhang, et al. "Optimal Design of Resonant Gate Driver for Buck Converter Based on a New Analytical Loss Model." IEEE Transactions on Power Electronics, Power Electronics, IEEE Transactions on, IEEE Trans. Power Electron, vol. 23, no. 2, March 2008, pp. 653-66.).

As for the CSD, a large drive current usually leads to a low switching loss. When a larger current flows through the power MOSFETs, a larger drive current is desired to further reduce the switching loss. However, the larger drive current will lead to a larger drive cycle loss; in addition, in case of a large load current, the turn-on loss of the power MOSFETs will be increased, resulting in a compromise between the switching loss, the gate drive loss and the turn-on loss.

In view of this, an adaptive CSD is proposed to improve the performance of the CSD to reduce the switching loss and the gate drive loss under different load currents (Zhiliang Zhang, et al., "Adaptive Current Source Drivers for Efficiency Optimization of High Frequency Synchronous Buck Converters." 2011 IEEE Energy Conversion Congress and Exposition, Energy Conversion Congress and Exposition (ECCE), 2011 IEEE, September 2011, pp. 1181-87. EBSCOhost, https://doi.org/10.1109/ECCE.2011.6063910.) In the CSD, when the drive voltage increases, the drive current will also increase linearly, and an adaptive drive current will be produced by an adaptive drive voltage. In this article, a simple method for realizing an adaptive drive current based an adaptive voltage is proposed, is implemented by a linear analog regulator, and has the advantages of being easy to implement and quick in response. However, in this scheme, the turn-on current and the turn-off current must be the same, so this scheme is not suitable for a condition where the turn-on current and the turn-off current are different. In addition, the linear voltage regulator results in an extra loss and high complexity of a drive circuit.

A digital adaptive CSD with a discontinuous CS induced current is further proposed (Zhiliang Zhang, et al., "A Digital Adaptive Discontinuous Current Source Driver for High-Frequency Interleaved Boost PFC Converters." IEEE Transactions on Power Electronics, Power Electronics, IEEE Transactions on, IEEE Trans. Power Electron, vol. 29, no. 3, March 2014, pp. 1298-310. EBSCOhost, https://doi.org/10.1109/TPEL.2013.2260175.). In this CSD, the turn-on drive current and the turn-off drive current are independent of the duty cycle and the switching frequency, the drive current is regulated by controlling the pre-charge time of a current-source inductor; for different turn-on and turn-off load currents, power curves of the switching loss and the drive loss are calculated to select the minimum loss points, such that the turn-on drive current and the turn-off drive current are designed separately. This scheme adopts a digital signal processor chip to realize adaptive regulation, thus reducing the loss caused by the analog regulator, reducing the complexity of the drive circuit, and providing a more flexible control algorithm to establish different turn-on and turn-off drive currents. However, this scheme fails to take into account the influence on the turn-on loss and leads to a large drive loss due to the use of a fixed drive voltage.

BRIEF SUMMARY OF THE INVENTION

Technical problem: In view of the abovementioned defects existing in the prior art, the objective of the invention is to provide an adaptive load optimization method for a resonant gate drive circuit to solve the technical problem that existing adaptive load optimization schemes neglect the turn-off loss of power MOSFETs and lead to an excessively large loss of a drive circuit.

Technical solution: The invention provides an adaptive load optimization method for a resonant gate drive circuit, wherein modules adopted by the method comprise a main power topology, a resonant gate driver, a four-channel driver, a low dropout regulator chip LDO, a digital signal processor chip DSP and resistors; wherein, the main power topology outputs a sampled load current I to the digital signal processor chip DSP, the digital signal processor chip DSP outputs six paths of signals, and four pulse-width modulation (PWM) channels, namely a PWM waveform port 1 PWM1, a PWM waveform port 2 PWM2, a PWM waveform port 3 PWM3 and a PWM waveform port 4 PWM4, of the digital signal processor chip DSP output four paths of signals to the four-channel driver; the four-channel driver correspondingly outputs signals, namely a Q1 gate voltage Vg1, a Q2 gate voltage Vg2, a Q3 gate voltage Vg3 and a Q4 gate voltage Vg4 to the resonant gate driver; a general-purpose input-output port GPIO of the digital signal processor chip DSP is connected to an enable pin EN of the low dropout regulator chip; a digital-to-analog converter terminal DAC of the digital signal processor chip is connected to the resonant gate driver by means of a first feedback resistor R1 and a second feedback resistor R2 which are connected in series, a midpoint of the first feedback resistor R1 and the second feedback resistor R2 which are connected in series is connected to a full-bridge pin $V_{FB}$ of the low dropout regulator chip, an output voltage port $V_C$ of the low dropout regulator chip is connected to the resonant gate driver, and the resonant gate driver outputs a power switch transistor drive signal to the main power topology.

Multiple power switch transistors (power MOSFETs) of the main power topology are driven by the resonant gate driver, and the resonant gate driver is composed of four MOSFETs and an isolation transformer; wherein a first MOSFET Q1 and a second MOSFET Q2 form a half-bridge, and a midpoint of the half-bridge is connected to a dotted terminal of a primary side of the isolation transformer and drives a fourth switch transistor S4 of the main power topology by means of a midpoint of a bridge arm; a third MOSFET Q3 and a fourth MOSFET Q4 form a half-bridge, and a midpoint of the half-bridge is connected to a non-dotted terminal of the primary side of the isolation transformer by means of a port and drives a second switch transistor S2 of the main power topology.

A coil is arranged on a secondary side of the isolation transformer to fulfill ungrounded drive to realize a design of multiple isolation drivers; in case of two complementary isolation drivers, two coils are designed on the secondary side, a dotted terminal of the coil at an upper end of the secondary side is connected to one terminal of a first gate parasitic capacitor Cgs1 of a first switch transistor S1 of the main power topology, and a non-dotted terminal of the coil at the upper end of the secondary side is connected to the other terminal of the first gate parasitic capacitor Cgs1 in an ungrounded manner; and a non-dotted terminal of the coil at a lower end of the secondary side is connected to one terminal of a third gate parasitic capacitor Cgs3 of a third switch transistor S3 of the main power topology, and a dotted terminal of the coil at the lower end of the secondary side is connected to the other terminal of the third gate parasitic capacitor Cgs3 in an ungrounded manner.

Gate input signals of the four MOSFETs are generated by the four-channel driver after the digital signal processor chip (DSP) sends out a signal; the four MOSFETs are designed in pairs to realize complementary conduction, and a circuit recovers gate drive energy of the main power topology by means of resonance of the gate parasitic capacitors and an inductor of the isolation transformer.

The optimization method optimizes a switching loss, a turn-on loss and a gate drive loss under different MOSFET loads; a data table is pre-stored in the digital signal processor chip, and voltages and pre-charge times, corresponding to a low total loss, of the resonant gate driver obtained by actual tests in case of different load currents are recorded in the data table; and in actual application, after an analog-to-digital converter terminal samples a load current, a load current, closest to the sampled load current, is read from the data table, and the digital signal processor chip is enabled to perform table look-up to obtain an optimized voltage and pre-charge time of a gate drive circuit.

The pre-charge time is changed by rewriting parameters of PWM registers in the digital signal processor chip; in a next cycle, the digital signal processor chip transmits four paths of signals to the four-channel driver by means of the four PWM channels to drive the resonant gate driver; a duty cycle of a gate drive waveform of one MOSFET of the resonant gate driver is changed, and because waveforms of the other MOSFETs are identical in phase with the waveform of said MOSFET or complementary in duty cycle with the waveform of said MOSFET, duty cycles and phases of the waveforms of the other MOSFETs are also determined, such that the pre-charge time of gates of the four switch transistors of the main power topology are changed.

A voltage of the resonant gate driver is changed by the digital signal processor chip and the low dropout regulator chip; a fixed voltage output by the low dropout regulator chip is accessed between one terminal of the first feedback resistor R1 and one terminal of the second feedback resistor R2, the other terminal of the second feedback resistor R2 is connected to the digital-to-analog converter terminal DAC of the digital signal processor chip, the other terminal of the first feedback resistor R1 is connected to an output terminal of the low dropout regulator chip, and a desired output voltage of the low dropout regulator chip is obtained by designing ranges of the feedback resistors and changing an output value of the digital-to-analog converter terminal DAC, so as to drive the resonant gate driver.

The digital signal processor chip refreshes values of PWM and DAC registers of the digital signal processor chip before each cycle by means of a DSP optimization algorithm to adjust the pre-charge time and voltage of the gate drive circuit in the next cycle so as to realize adaptive optimization of a load of the main power topology, and next optimization is performed at an appropriate time.

Beneficial effects: By adopting the above technical solution, the invention has the following advantages:

The invention optimizes the switching loss, turn-on loss and gate drive loss of the main power topology under different loads. The DSP chip is enabled to perform table look-up to obtain the optimized voltage and pre-charge time of the gate drive circuit, such that the computation of the optimization algorithm is relatively small, and the extra power consumption generated by the DSP chip is low.

DETAILED DESCRIPTION OF THE INVENTION

The technical solution of the invention is described in detail below in conjunction with the accompanying drawings.

Figure 1:
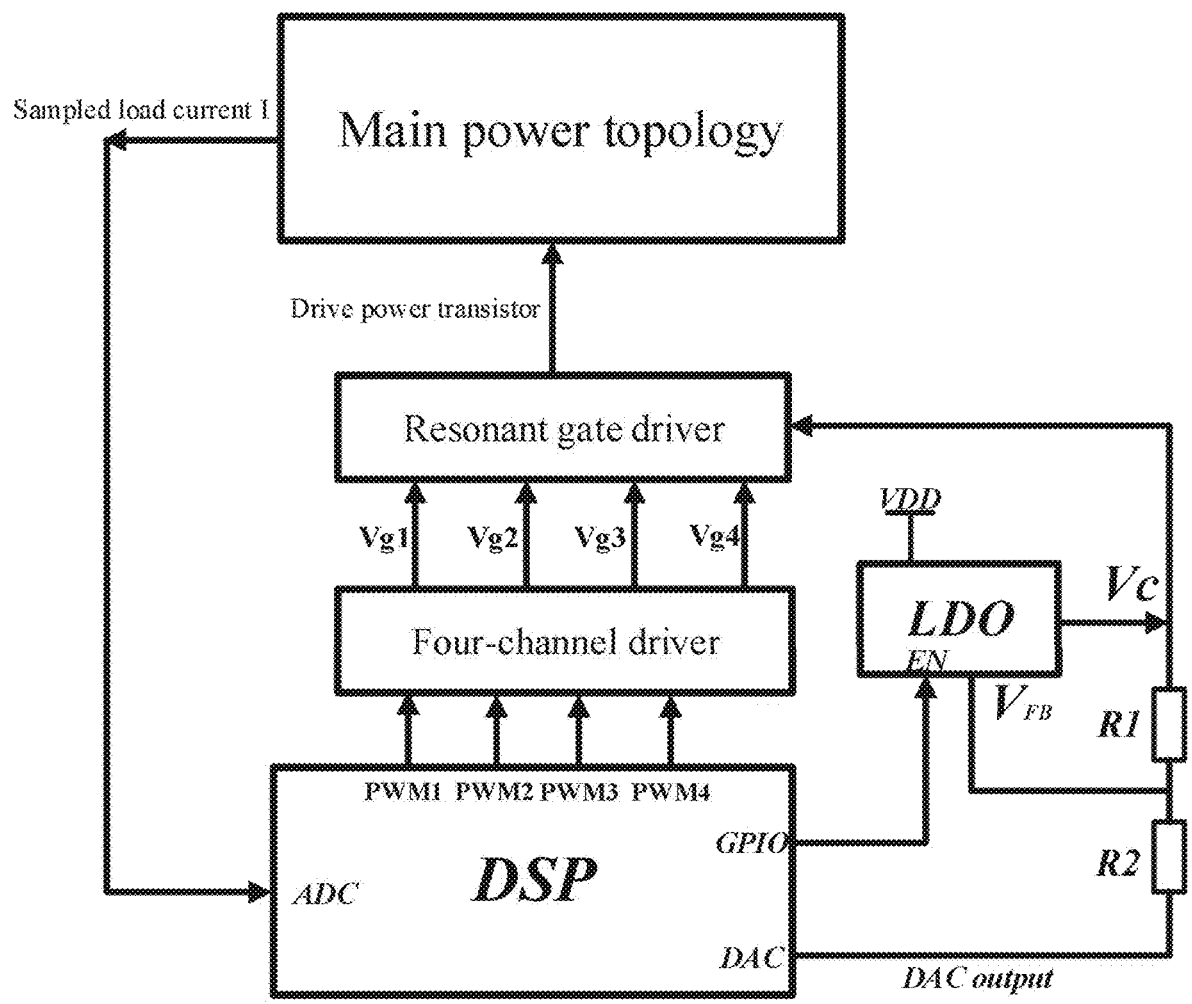
FIG. 1 is a block diagram of all modules according to the invention.

To fulfill the above objective, the invention adopts a four-switch resonant gate drive circuit for multiplex driving, which is implemented as follow:

In specific implementation of the technical solution of the invention, the four-switch resonant gate drive circuit can be used for driving four main switch transistors of an LLC-DCX transformer. As shown in FIG. 1, the ADC of the DSP samples a load current I of a main power topology, and the load current I is substituted into a total loss function obtained by mathematical modeling, then the coordinates of a point corresponding to a minimum value of the function are calculated to obtain an optimized voltage Vc and pre-charge time $T_{pre}$ of the gate drive circuit in the next cycle. Signals are input by means of a PWM waveform port 1 PWM1, a PWM waveform port 2 PWM2, a PWM waveform port 3 PWM3 and a PWM waveform port 4 PWM4 to a four-channel driver to respectively drive a first MOSFET Q1, a second MOSFET Q2, a third MOSFET Q3, a fourth MOSFET Q4 of the resonant gate driver so as to drive power switch transistors of a main power topology. An enable pin of a low dropout regulator chip LDO is connected to a GPIO port of the digital signal processor chip DSP, an input voltage is VDD, an output voltage is Vc, and $V_{FB}$ is a fixed voltage output by the pin, which means that the voltage of an intermediate node between a first feedback resistor R1 and a second feedback resistor R2 is fixed; a lower terminal of the second feedback resistor R2 is connected to a DAC output port of the digital signal processor chip DSP, an upper terminal of the first feedback resistor R1 is connected to an output port of the low dropout regulator chip LDO, and the output voltage Vc of the low dropout regulator chip LDO is accessed to the resonant gate driver to provide an output voltage. The resistance of the first feedback resistor R1 can be designed to be in a certain proportion with the resistance of the second feedback resistor R2. In this way, a desired output voltage Vc can be obtained by regulating output values of DAC registers.

Figure 2:
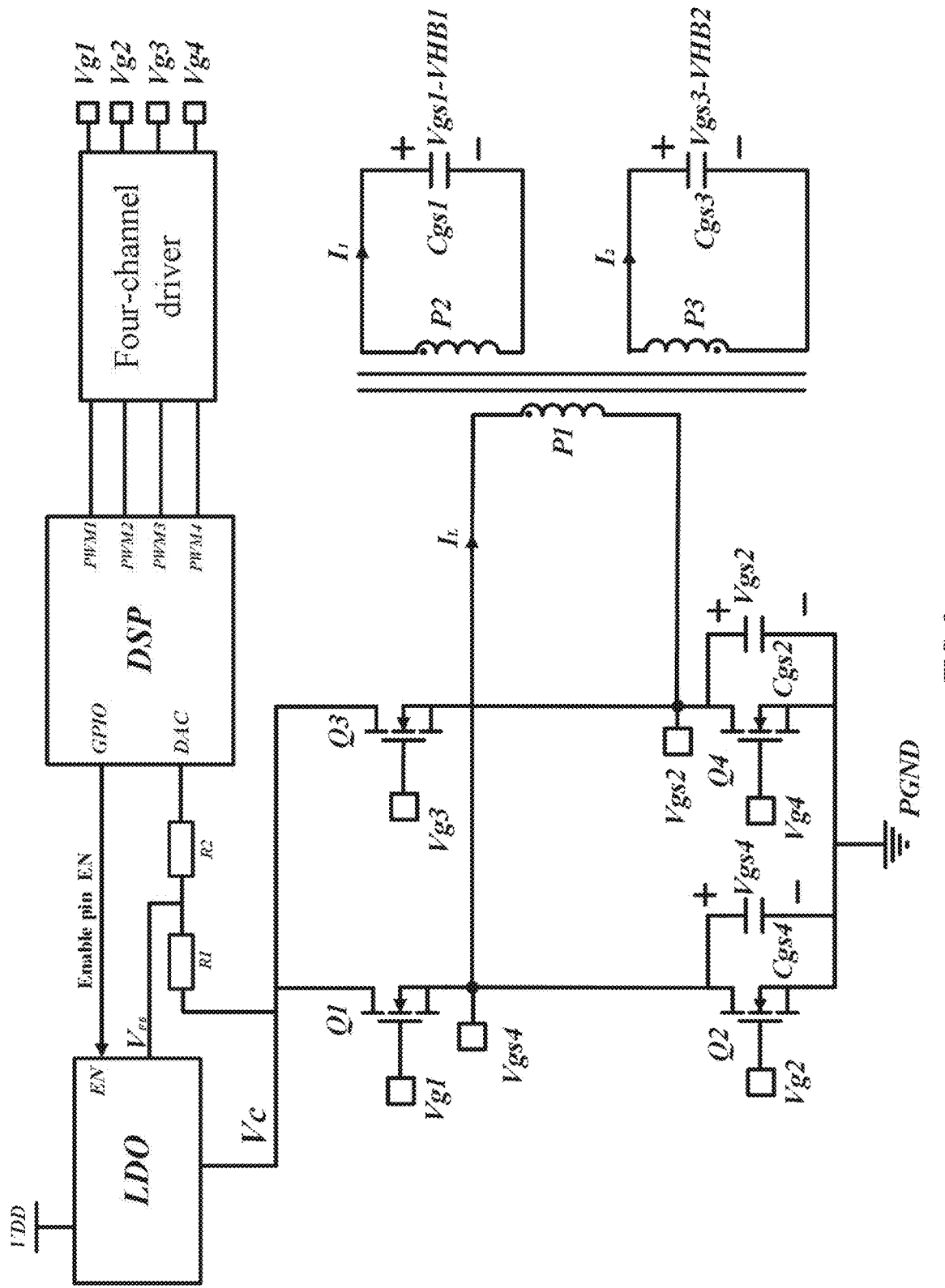
FIG. 2 is a structural diagram of a resonant gate driver module according to the invention.

The structure of a resonant gate driver module in this technical solution is shown in FIG. 2. Wherein, gates of four MOSFETs, namely the first MOSFET Q1, the second MOSFET Q2, the third MOSFET Q3 and the fourth MOSFET Q4, are respectively connected to a Q1 gate voltage port Vg1, a Q2 gate voltage port Vg2, a Q3 gate voltage port Vg3 and a Q4 gate voltage port Vg4 respectively. The first MOSFET Q1 and the second MOSFET Q2 form a half-bridge, and the third MOSFET Q3 and the fourth MOSFET Q4 form a half-bridge. A source of the first MOSFET Q1 is connected to the port Vgs4 and is also connected to a dotted terminal of a primary-side coil P1 of a transformer. A drain of the fourth MOSFET Q4 is connected to the port Vgs2 and is also connected to a non-dotted terminal of the primary-side coil P1 of the transformer. Vgs1-VHB1, Vgs2, Vgs3-VHB2 and Vgs4 are voltages of two terminals of a first gate parasitic capacitor Cgs1 of a first switch transistor, a second gate parasitic capacitor Cgs2 of a second switch transistor, a third gate parasitic capacitor Cgs3 of a third switch transistor and a fourth gate parasitic capacitor Cgs4 of a fourth switch transistor respectively, wherein the fourth gate parasitic capacitor Cgs4 of the fourth switch transistor is connected in parallel to two sides of the second MOSFET Q2, the second gate parasitic capacitor Cgs2 of the second switch transistor are connected in parallel to two sides of the fourth MOSFET Q4, the first gate parasitic capacitor Cgs1 of the first switch transistor is connected in parallel to two sides of a first secondary side P2, and the third gate parasitic capacitor Cgs3 of the third switch transistor is connected in parallel to two sides of a second secondary side P3. A current on the primary-side coil is set as $I_L$ and flows in from the dotted terminal, a current on the first secondary side P2 is set as $I_1$ and flows in from a dotted terminal, and a current on the second secondary side P3 is set as $I_2$ and flows in from a dotted terminal. Gates of the second switch transistor S2 and the fourth switch transistor S4 of the main power topology are connected to ports of the resonant gate driver respectively, that is, the drain of the fourth MOSFET Q4 is connected to the port Vgs2, and the source of the first MOSFET Q1 is connected to the port Vgs4. A gate of the first switch transistor S1 of the main power topology is connected to a forward terminal of the first gate parasitic capacitor Cgs1, and a first half-bridge of the main power topology is connected to a reverse terminal of the first gate parasitic capacitor Cgs1. A gate of the third switch transistor of the main power topology is connected to a forward terminal of the third gate parasitic capacitor Cgs3, and a second half-bridge of the main power topology is connected to a reverse terminal of the third gate parasitic capacitor Cgs3.

In FIG. 2, four paths of PWM signals generated by the digital signal processor chip DSP are accessed to the gate driver module, and a Q1 gate voltage Vg1, a Q2 gate voltage Vg2, a Q3 gate voltage Vg3 and a Q4 gate voltage Vg4 are accessed to output ports of the resonant gate driver to drive the four MOSFETs of the resonant gate driver respectively. The output voltage Vc of the low dropout regulator chip LDO is accessed to a drain of the first MOSFET Q1 and a drain of the third MOSFET Q3 respectively to provide a charge voltage, and the other elements are the same as described in FIG. 1.

Figure 3:
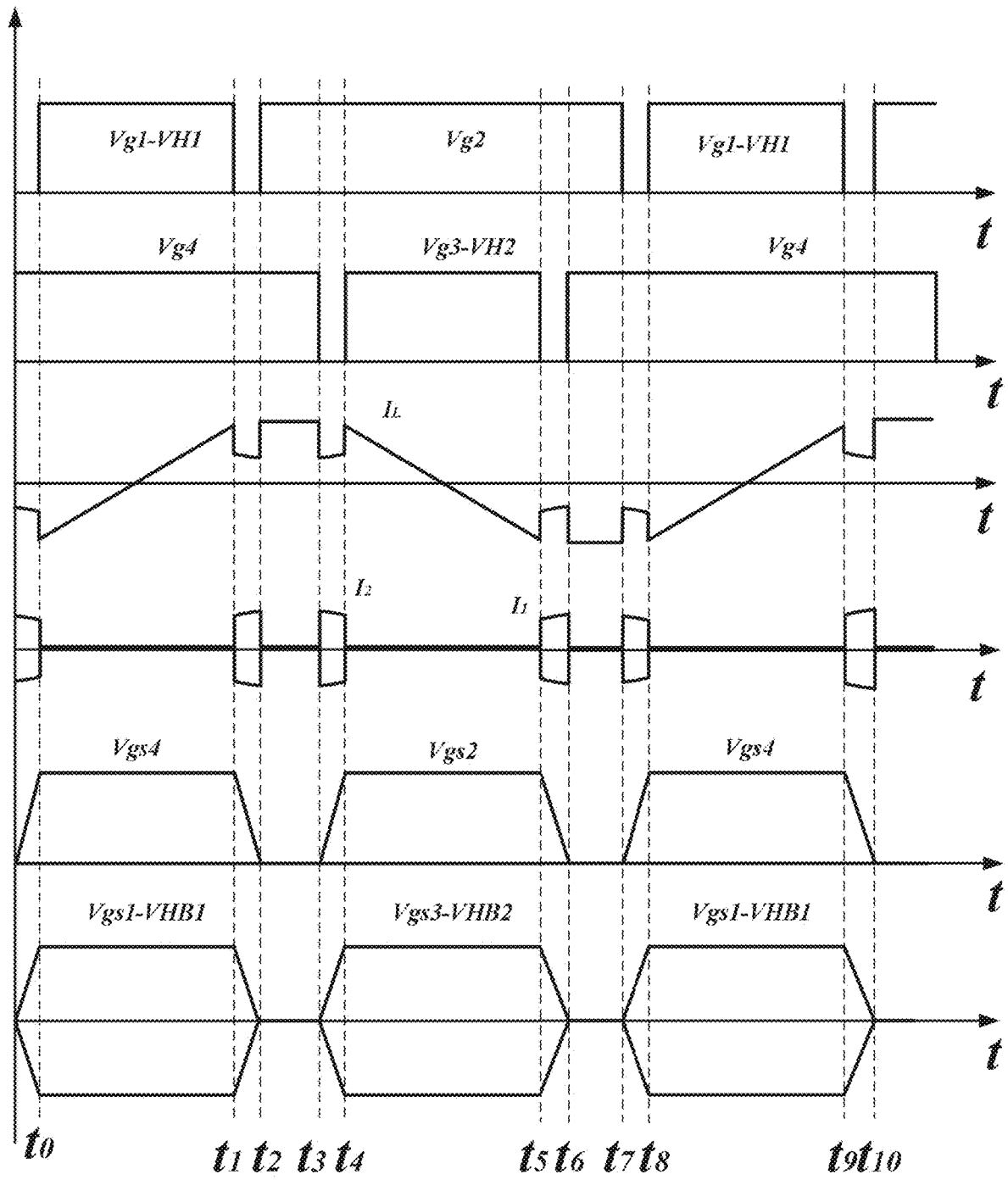
FIG. 3 is a main oscillogram of the resonant gate driver module according to the invention.

A main oscillogram of the resonant gate driver module in the invention is shown in FIG. 3, wherein the horizontal coordinate is time t, Vg1-VH1; and the vertical coordinate Vg1-VH1 is a gate-source voltage of the first MOSFET, the vertical coordinate Vg2 is a gate-source voltage of the second MOSFET, the vertical coordinate Vg3-VH2 is a gate-source voltage of the third MOSFET, and the vertical coordinate Vg4 is a gate-source voltage of the fourth MOSFET. $I_L$ is a current flowing into the dotted terminal of P1, $I_1$ is a current flowing out of the dotted terminal of the first secondary side P2, and $I_2$ is a current value flowing into the dotted terminal of the second secondary side P3. Vgs2 and Vgs4 are gate-source voltages of the second switch transistor and the fourth switch transistor of the main power topology respectively, and Vgs1-VHB1 and Vgs3-VHB2 are gate-source voltages of the first switch transistor and the third switch transistor of the main power topology respectively.

It can be seen, from the oscillogram, that eight different working modes can be realized according to different input signals, and the resonant circuit is in different states in different working modes. Wherein, $t_0$-$t_1$ is a pre-charge state before the first switch transistor and the fourth switch transistor are turned off and is also a pre-charge state before the second switch transistor and the third transistor are turned on; $t_4$-$t_5$ is a pre-charge state before the second switch transistor and the third switch transistor are turned off and is also a pre-charge state before the first switch transistor and the fourth switch transistor are turned on. The times of these pre-charge states can be set to be the same $T_{pre}$, so the pre-charge time can be changed by changing the duty cycle of the gate drive waveform of the first MOSFET Q1 (changing the duty-cycle register of the PWM1 of the digital signal processor chip DSP), and a certain dead time needs to be guaranteed at the same time.

Figure 4:
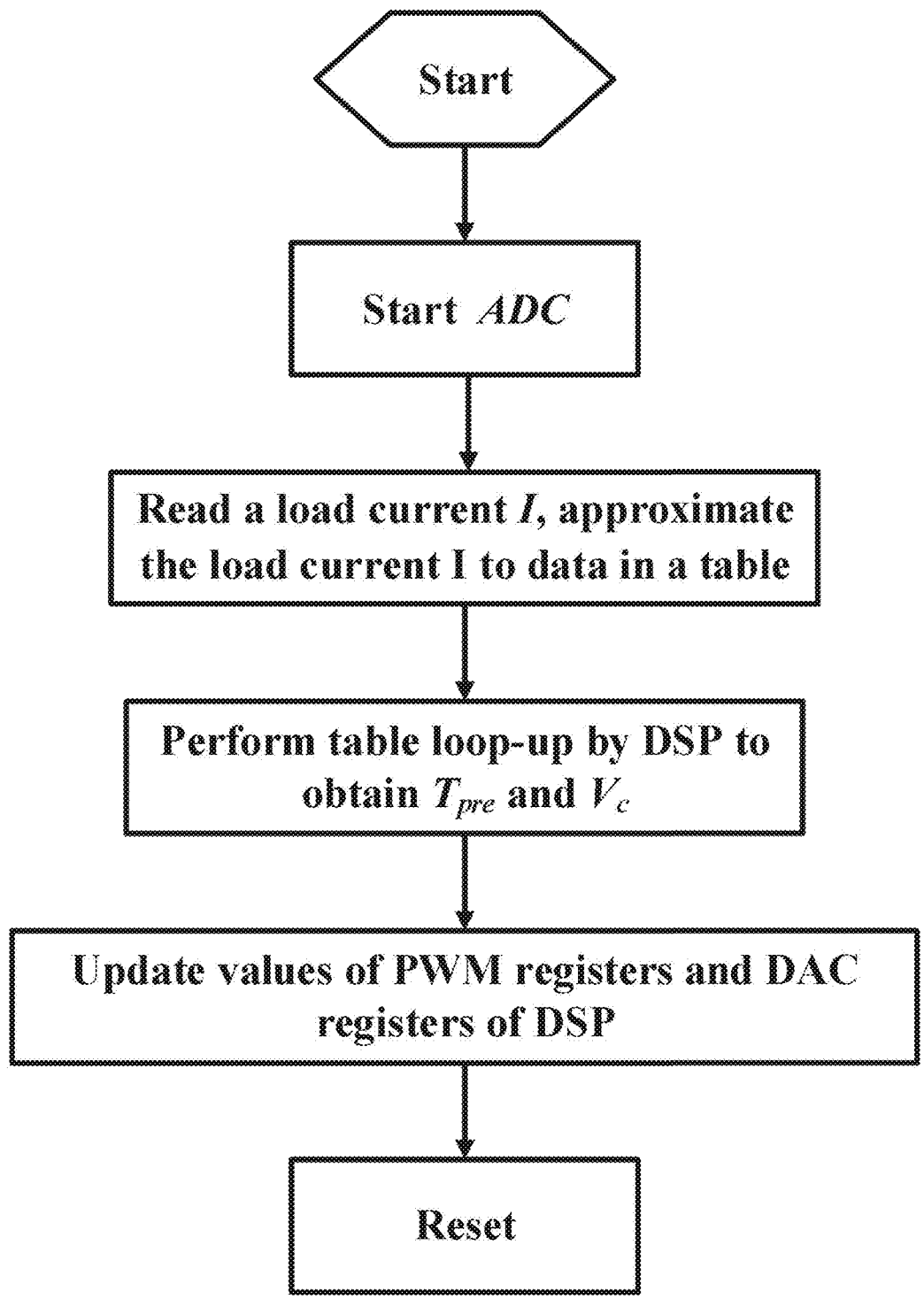
FIG. 4 is a flow diagram of an adaptive algorithm of a DSP chip according to the invention.

An adaptive algorithm of the digital signal processor chip DSP of the invention is shown in FIG. 4. In order to reduce computation and increase the running speed of the algorithm, ADC samples the load current I of the main power topology every a plurality of cycles, a data table is pre-stored in the digital signal processor chip DSP, and voltages and pre-charge times, corresponding to a low total loss, of the resonant gate drive circuit obtained by actual tests in case of different load currents are recorded in the data table; and in actual application, after ADC samples a load current, a load current value closest to the sampled load current is read from the data table, and the digital signal processor chip DSP is enabled to perform table look-up to obtain optimized $T_{pre}$ and Vc. Finally, the duty cycle and phase in PWM registers of the digital signal processor chip DSP are updated to adapt to optimized $T_{pre}$, and the value of the DAC registers is updated to allow the output voltage of the low dropout regulator chip LDO to adapt to optimized Vc.

The digital signal processor chip DSP can refresh the values of PWM and DAC registers of the digital signal processor chip DSP before each cycle by means of an optimization algorithm to adjust the pre-charge time and voltage of the gate drive circuit in the next cycle so as to realize adaptive optimization of a load of the main power topology, and next optimization is performed at an appropriate time.

Figure 5:
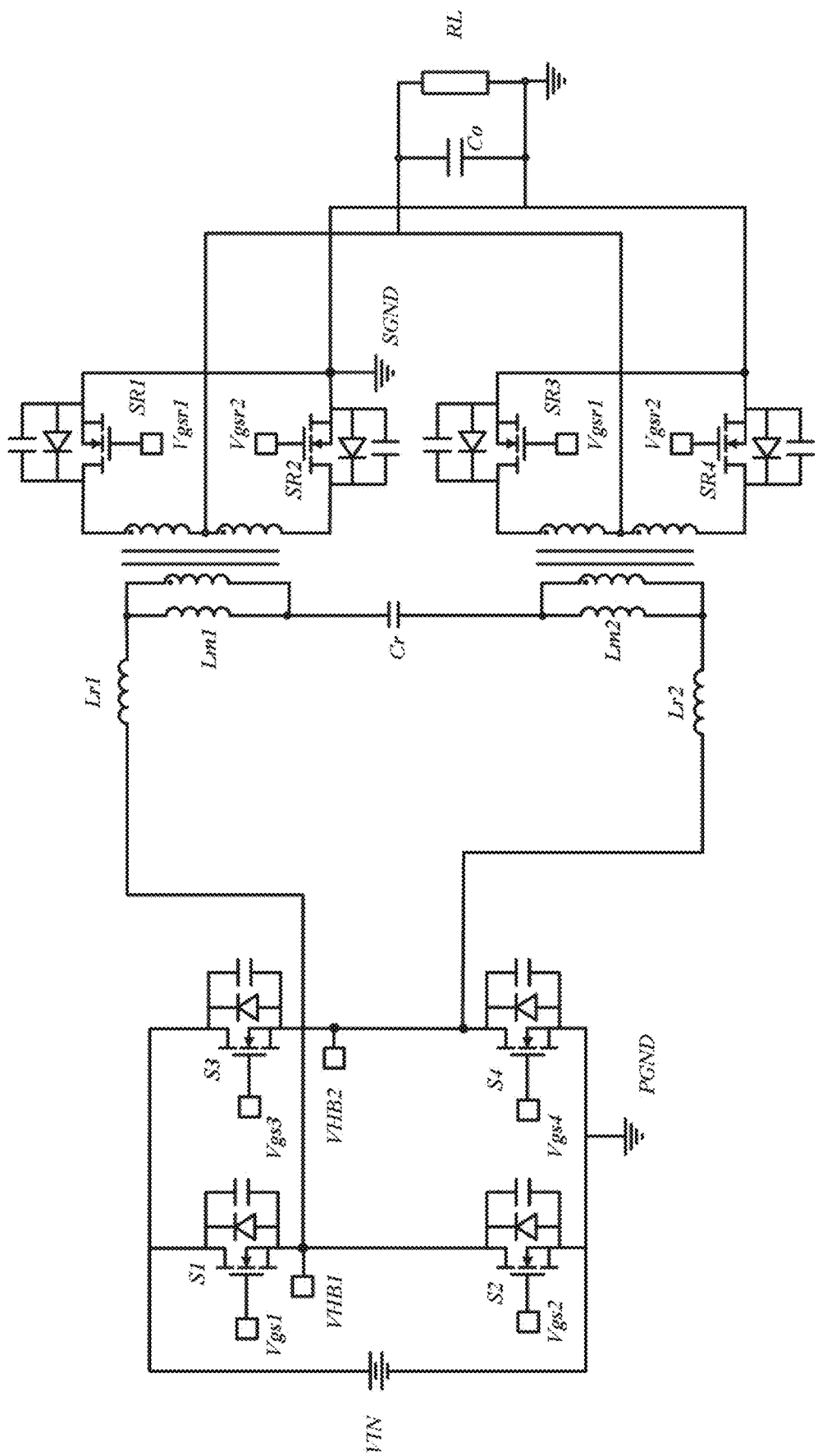
FIG. 5 is a structural diagram of a main power topology of the invention.

The structure of the LLC-DCX transformer used in specific solution of the invention is shown in FIG. 5.

What is claimed is:

1. An adaptive load optimization method for a resonant gate drive circuit, wherein:
    modules adopted by the method comprise a main power topology, a resonant gate driver, a four-channel driver, a low dropout regulator chip, a digital signal processor chip, a first feedback resistor and a second feedback resistor; wherein the main power topology outputs a sampled load current to the digital signal processor chip, the digital signal processor chip outputs six paths of signals, four paths of signals of the six paths of signals include four pulse-width modulation (PWM) channels connected to the four channel driver, the four pulse-width modulation (PWM) channels comprising a first PWM waveform port, a second PWM waveform port, a third PWM waveform port and a fourth PWM waveform port; the four-channel driver correspondingly outputs a plurality of signals to drive the resonant gate driver, the plurality of signals comprising a Q1 gate voltage, a Q2 gate voltage, a Q3 gate voltage and a Q4 gate voltage; a general-purpose input-output port of the digital signal processor chip is connected to an enable pin of the low dropout regulator chip; a digital-to-analog converter terminal of the digital signal processor chip is connected to the resonant gate driver using the first feedback resistor and the second feedback resistor which are connected in series, a midpoint of the first feedback resistor and the second feedback resistor is connected to a full-bridge pin of the low dropout regulator chip, an output voltage port of the low dropout regulator chip is connected to the resonant gate driver, and the resonant gate driver outputs a power switch transistor drive signal to control the main power topology,
    wherein multiple power switch transistors of the main power topology are driven by the resonant gate driver, and the resonant gate driver is composed of four metal-oxide-semiconductor field effect transistors (MOSFETs) and an isolation transformer; wherein a first MOSFET and a second MOSFET of the four MOSFETs form a first half-bridge, and a midpoint of the first half-bridge is connected to a dotted terminal of a primary side of the isolation transformer and drives a fourth switch transistor of the main power topology using a midpoint of a bridge arm; and a third MOSFET and a fourth MOSFET of the four MOSFETs form a second half-bridge, and a midpoint of the second half-bridge is connected to a non-dotted terminal of the primary side of the isolation transformer using a port and drives a second switch transistor of the main power topology, and
    wherein a coil is arranged on a secondary side of the isolation transformer; wherein in case of two complementary isolation drivers, two coils are arranged on the secondary side, a dotted terminal of the coil at an upper end of the secondary side is connected to one terminal of a first gate parasitic capacitor of a first switch transistor of the main power topology, and a non-dotted terminal of the coil at the upper end of the secondary side is connected to the other terminal of the first gate parasitic capacitor in an ungrounded manner; and a non-dotted terminal of the coil at a lower end of the secondary side is connected to one terminal of a third gate parasitic capacitor of a third switch transistor of the main power topology, and a dotted terminal of the coil at the lower end of the secondary side is connected to the other terminal of the third gate parasitic capacitor in an ungrounded manner.

2. The adaptive load optimization method for the resonant gate drive circuit according to claim 1, wherein gate input signals of the four MOSFETs are generated by the four-channel driver after the digital signal processor chip sends out a signal; the four MOSFETs are arranged in pairs to perform complementary conduction, and a circuit recovers gate drive energy of the main power topology using resonance of the first and third gate parasitic capacitors and an inductor of the isolation transformer.

3. The adaptive load optimization method for the resonant gate drive circuit according to claim 1, wherein the optimization method optimizes a switching loss, a turn-on loss and a gate drive loss under different MOSFET loads; wherein a data table is pre-stored in the digital signal processor chip, and voltages and pre-charge times, corresponding to a low total loss, of the resonant gate driver obtained by performing tests in case of different load currents are recorded in the data table; wherein after an analog-to-digital converter terminal samples load currents, a load current, closest to the sampled load current, is read from the data table, and the digital signal processor chip is enabled to perform table look-up to obtain an optimized voltage and pre-charge time of a gate drive circuit.

4. The adaptive load optimization method for the resonant gate drive circuit according to claim 3, wherein the pre-charge time is changed by rewriting parameters of PWM registers in the digital signal processor chip; in a next cycle, the digital signal processor chip transmits the four paths of signals to the four-channel driver using the four PWM channels to drive the resonant gate driver; a duty cycle of one MOSFET gate drive waveform of the resonant gate driver is changed, and because waveforms of the other MOSFETs are identical in phase with the waveform of the MOSFET or complementary in duty cycle with the waveform of the MOSFET, duty cycles and phases of the waveforms of the other MOSFETs are also determined, such that the pre-charge time of gates of the four switch transistors of the main power topology are changed.

5. The adaptive load optimization method for the resonant gate drive circuit according to claim 3, wherein a voltage of the resonant gate driver is changed by the digital signal processor chip and the low dropout regulator chip; a fixed voltage output by the low dropout regulator chip is accessed between one terminal of the first feedback resistor and one terminal of the second feedback resistor, the other terminal of the second feedback resistor is connected to the digital-to-analog converter terminal of the digital signal processor chip, the other terminal of the first feedback resistor is connected to the output voltage port of the low dropout regulator chip, and a desired output voltage of the low dropout regulator chip is obtained by controlling ranges of the first and second feedback resistors and changing an output value of the digital-to-analog converter terminal, so as to drive the resonant gate driver.

6. The adaptive load optimization method for the resonant gate drive circuit according to claim 3, wherein the digital signal processor chip refreshes values of PWM and DAC registers of the digital signal processor chip before each cycle using a DSP optimization algorithm to adjust the pre-charge time and voltage of the gate drive circuit in a next cycle, so as to realize adaptive optimization of a load of the main power topology, and next optimization is performed at a predetermined time.

* * * * *